United States Patent [19]

Moreau

[11] 4,140,194
[45] Feb. 20, 1979

[54] AUXILIARY HYDRAULIC DRIVE FOR A TRAILER-TRACTOR COMBINATION

[76] Inventor: Marius Moreau, 128, rue Jean Moulin, 69300 Caluire, France

[21] Appl. No.: 781,448

[22] Filed: Mar. 25, 1977

Related U.S. Application Data

[62] Division of Ser. No. 639,596, Dec. 10, 1975, abandoned.

[30] Foreign Application Priority Data

Dec. 12, 1974 [FR] France .................................. 74 41694

[51] Int. Cl.² .......................................... B62D 59/04
[52] U.S. Cl. ................................ 180/14 A; 180/44 F; 192/0.096; 192/85 AA
[58] Field of Search .................. 180/14 A, 14 R, 44 F; 192/0.096, 85 R, 85 AA; 91/412

[56] References Cited

U.S. PATENT DOCUMENTS

| | | | |
|---|---|---|---|
| 3,293,942 | 12/1966 | Stein et al. | 180/14 AX |
| 3,352,392 | 11/1967 | Black et al. | 192/85 R X |
| 3,612,202 | 10/1971 | Moon, Jr. et al. | 180/14 A |
| 3,736,732 | 6/1973 | Jennings et al. | 56/11.8 X |
| 4,070,857 | 1/1978 | Wible | 91/412 X |

*Primary Examiner*—Joseph F. Peters, Jr.
*Assistant Examiner*—Michael Mar
*Attorney, Agent, or Firm*—Michael J. Striker

[57] ABSTRACT

A tractor-trailer combination includes an auxiliary hydraulic drive motor for driving an axle of the trailer and a hydraulic coupling for coupling and uncoupling the hydraulic drive motor and the axle depending on the speed of movement of the trailer tractor combination.

1 Claim, 2 Drawing Figures

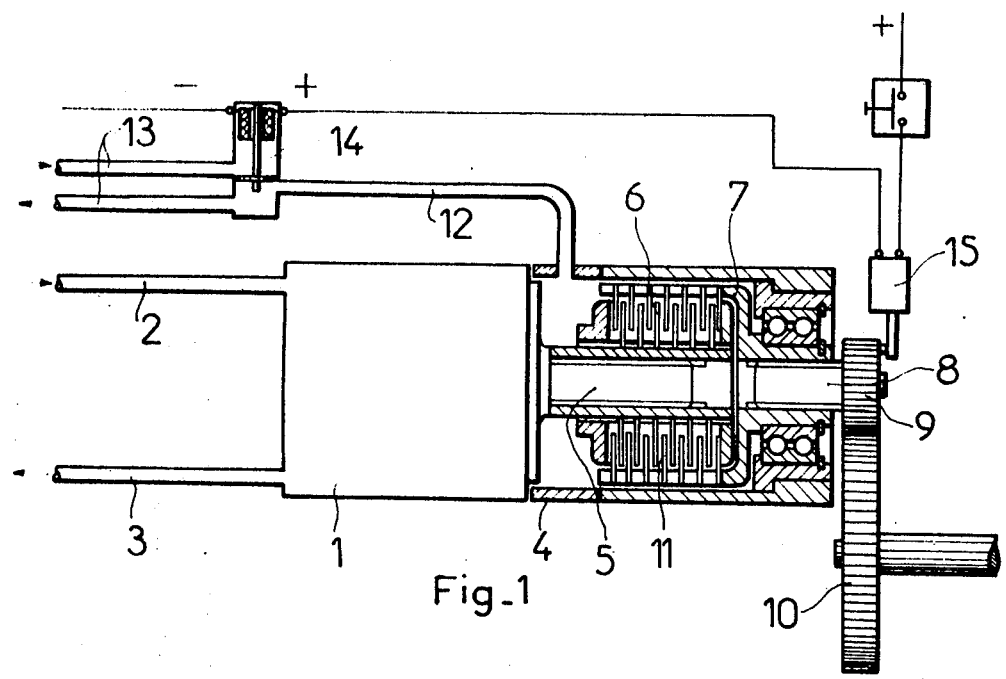
Fig_1
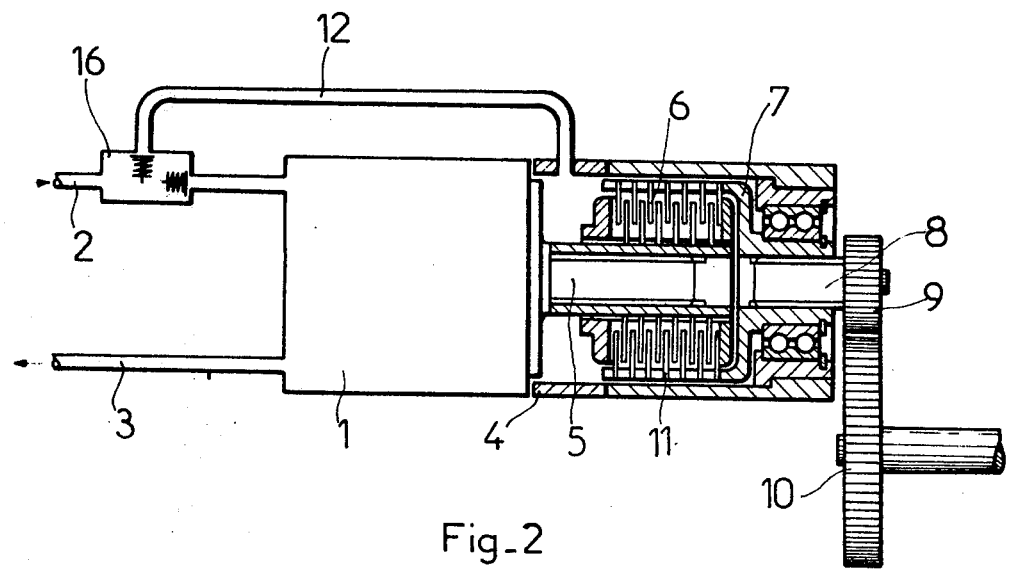
Fig_2

AUXILIARY HYDRAULIC DRIVE FOR A TRAILER-TRACTOR COMBINATION

This is a division, of application Ser. No. 639,596, filed Dec. 10, 1975, now abandoned.

BACKGROUND OF THE INVENTION

The present invention relates to an auxiliary hydraulic drive for a trailer tractor combination, which combination may include a driven vehicle and a trailer articulately connected thereto or a tractor having a saddle to which the trailer is pivotally connected.

It is already known to provide on the trailing vehicle an auxiliary hydraulic drive to thereby increase the drive adhearance of the trailing vehicle during travel of the tractor-trailer combination over every terrain even if wet, slippery, icy or covered with snow. This arrangement consists essentially in providing at least one axle of the trailer with an auxiliary hydraulic motor which can be actuated at any time chosen by the driver. Such auxiliary hydraulic motor is driven by hydraulic fluid supplied by a pump driven by the drive motor of the tractor.

An improvement of the aforementioned arrangement consists to provide the hydraulic circuit with a self-regulating pressure system to avoid deterioration of the hydraulic motor due to variations of the torque applied to the wheels driven by the hydraulic motor which will result from a difference of the adherence of the wheels to the ground over which the vehicle is passing. However, despite this known regulator system it has been necessary to uncouple the wheels from the hydraulic motor whenever the speed of movement of the tractor-trailer combination surpasses about 15 kilometers per hour, and it has been also necessary to stop the tractor-trailer combination in order to recouple the hydraulic motor to the wheels. This inconvenience is especially pronounced if the tractor-trailer combination has to move through long distances over different terrain since this may entail the risk of total immobilization in the event the driver carries out wrong operations.

SUMMARY OF THE INVENTION

It is an object of the present invention to permit coupling and uncoupling of hydraulic motors for driving the axles of the trailer without stopping the tractor-trailer combination.

It is a further object of the present invention to permit the coupling of the hydraulic motor to the axle to be driven thereby in an automatic manner at an exact and predetermined speed of rotation of the wheels on such axles.

It is an additional object of the present invention to permit the coupling and uncoupling of the hydraulic motors in a progressive manner.

With these and other objects in view, which will become apparent as the description proceeds, the present invention mainly comprises at least on auxiliary hydraulic motor for driving an axle of the trailer of a tractor-trailer combination, and coupling means for coupling and uncoupling the auxiliary hydraulic motor to this axle. Such coupling means preferably comprise a hydraulic coupling, but electromagnetic, pneumatic or mechanic couplings may also be used.

In order to assure automatic operation of the coupling means in dependence on the speed of movement of the tractor-trailer combination, a relay or tachometer may be used which produces a hydraulic, electric, pneumatic or mechanical signal to the coupling means or clutch at a predetermined speed of movement of the tractor-trailer combination to couple the hydraulic motor to the axle and at another predetermined speed to uncouple the hydraulic motor from the axle.

According to a modification of the present invention a hydraulic control of the clutch or coupling means may be obtained from the supply circuit of the hydraulic motor in such a manner that a drop of pressure in the supply circuit of the hydraulic motor or motors, especially created by a pronounced increase of their speed of rotation, will produce control of the clutch in the sense of uncoupling the hydraulic motor or motors from the respective axle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 schematically illustrates a hydraulic motor equipped with a hydraulic clutch and control means for actuating and deactuating the clutch; and FIG. 2 is a schematic view similar to that shown in FIG. 1 in which the clutch is controlled by the pressure of the fluid fed to the hydraulic motor to drive the latter.

DESCRIPTION OF THE PREFERRED EMBODIMENTS

FIG. 1 schematically illustrates a hydraulic motor 1 which receives fluid under pressure from a distributor, not shown in the drawing, through a conduit 2 and the fluid is returned to the distributer through a conduit 3 so that the output shaft 5 of the hydraulic motor is driven in a manner well known in the art.

According to the present invention the hydraulic motor 1 is provided with a hydraulic coupling means or clutch 4. The output shaft 5 of the hydraulic motor is fixedly connected to the male parts 6 of the hydraulic clutch, whereas the female parts 7 thereof are fixedly connected to a shaft 8, coaxial with the output shaft 5, which carries a pinion 9 for rotation therewith and meshing with a gear 10 larger than the pinion 9. The gear 10, in turn is connected to an axle on which wheels of the trailer, not represented in the drawing, are mounted.

The connection and deconnection of the male parts 6 and the female parts 7 of the clutch is carried out in a manner known per se by means of a plurality of parallel discs 11 which are immersed in oil.

The oil or control fluid of the clutch is supplied and withdrawn through a hydraulic circuit 13, a conduit 12 and a solenoid valve 14 at the junction of the circuit 13 with the conduit 12, schematically illustrated in FIG. 1. The solenoid valve 14, in turn, is controlled by an electric relay or tachometer 15 driven by the rotation of the shaft 8 connected by the pinion 9 and the gear 10 to the axle of the trailer.

When the hydraulic motor 1 is supplied with pressure fluid and turns and when the gear 10 is engaged with the means for driving an axle of the trailer, it is sufficient to close the circuit of the solenoid valves 14 so that the latter will supply pressure fluid through the conduit 12 to the hydraulic clutch 4. The clutch 4 will thus couple the motor 1 with the gear 10. When the speed of rotation of the thus driven wheels, and in consequence the speed of rotation of the shaft 8 will obtain a critical value, the relay 15 will open the electrical circuit of the solenoid valve 14 so that the latter will prevent passage of hydraulic fluid to the clutch 4 and the latter will uncouple the motor 1 from the gear 10.

Conversely, if the speed of the tractor-trailer combination decreases essentially with a correspondent reduction of the speed of rotation of the shaft 8, the relay 15 will actuate the solenoid valve 14 so that the hydraulic clutch 4 will be supplied with pressure fluid to thereby couple the motor 1 to the gear 10 and to drive wheels of the trailer.

Thus, it will be easily understood if the tractor-trailer combination provided with the above-described arrangement passes successively over difficult and easy stretches during its travel, which formerly required each time arresting of the tractor-trailer combination in order to couple or uncouple the auxiliary hydraulic drive, such coupling and uncoupling of the hydraulic motor 1 will be carried out by the above-described arrangement automatically in dependence on the speed of the tractor-trailer combination.

In the modification schematically illustrated in FIG. 2, the supply of fluid to the hydraulic coupling 4 is derived from the supply circuit of the hydraulic motor 1 in which a calibrated valve 16 is arranged in the conduit 2 supplying the hydraulic motor 1 with pressure fluid through a first outlet and in which the conduit 12 for supplying pressure fluid to the hydraulic clutch 4 is connected to a second outlet of the valve 16. The valve 16 is calibrated in such a manner that there is priority for supplying pressure fluid to the hydraulic clutch 4. The second outlet is opened prior to the opening of said first outlet and is closed subsequent to the closing of the first outlet.

As will be easily understood that when the fluid pressure in the hydraulic motor 1 drops, for example due to an essential increase of the speed of the tractor-trailer combination, such that the hydraulic motor 1 may be transformed into a pump for aspiration of fluid, the hydraulic clutch 4 will receive consequently fluid with insufficient pressure to uncouple the motor 1 from the gear train driving the wheel axle of the trailer to thus avoid deterioration of the hydraulic motor.

The described coupling arrangement may be used especially, but not exclusively, to provide an auxiliary drive for trailers with gear hydraulic motors, the low starting torque of which would render such motors unsuitable for such a purpose. This is due to the possibility of a progressive coupling engagement which is provided by the arrangement according to the present invention.

It will be understood that each of the elements described above, or two or more together, may also find a useful application in other types of auxiliary hydraulic motors for driving axles of a trailer and coupling means for coupling and uncoupling the auxiliary hydraulic motor to and from the axles differing from the types described above.

While the invention has been illustrated and described as embodied in an auxiliary hydraulic motor for driving an axle of a trailer with coupling means for coupling and uncoupling the auxiliary hydraulic motor to and from the axle and in which means for controlling the coupling means in dependence on the speed of movement of the trailer are provided, it is not intended to be limited to the details shown, since various modifications and structural changes may be made without department in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. For use with a trailer driven by a tractor, a combination comprising at least one auxiliary hydraulic motor for driving an axle of the trailer; a first conduit for supplying hydraulic fluid under pressure to said hydraulic motor; a second conduit for discharging hydraulic fluid therefrom; hydraulic clutch means connected to said first conduit to be supplied with hydraulic fluid therefrom for coupling and uncoupling said auxiliary hydraulic motor to and from said axle; and valve means in said first conduit and having a first outlet connected to said hydraulic motor, a second outlet connected to said hydraulic clutch, and spring biased valve members for respectively opening and closing said outlets, said spring biased valve members being calibrated to assure that said second outlet is opened prior to the opening of said first outlet and is closed subsequent to the closing of the first outlet.

* * * * *